United States Patent [19]

Rieger

[11] 4,165,775
[45] Aug. 28, 1979

[54] TIRE CHAIN

[76] Inventor: Werner Rieger, Haus Häselbach, 7080 Aalen 1, Fed. Rep. of Germany

[21] Appl. No.: 847,040

[22] Filed: Oct. 31, 1977

[30] Foreign Application Priority Data

Nov. 9, 1976 [DE] Fed. Rep. of Germany ....... 2651522

[51] Int. Cl.² .............................................. B60C 27/06
[52] U.S. Cl. ...................................... 152/243; 59/85; 74/254
[58] Field of Search ................................ 152/170–184, 152/185–194, 231–245, 208; 74/254; 59/84, 85, 90, 78

[56] References Cited

U.S. PATENT DOCUMENTS

| 1,871,521 | 8/1932 | Hodell | 152/231 X |
| 1,921,192 | 8/1933 | Keaney | 152/232 |
| 2,952,162 | 9/1960 | Thibault | 74/254 |
| 3,426,823 | 2/1969 | Rieger | 152/231 |
| 3,631,912 | 1/1972 | Rieger et al. | 152/239 |
| 4,042,001 | 8/1977 | Muller | 152/243 |

Primary Examiner—Joseph F. Peters, Jr.
Assistant Examiner—D. W. Underwood
Attorney, Agent, or Firm—Parmelee, Johnson, Bollinger & Bramblett

[57] ABSTRACT

A tire chain with a plurality of vertical links connected to each other by means of connecting elements, each comprising an essentially double-T-shaped basic body provided with at least one projection between its cross-bars, which projection is offset by 90° to the cross-bars and projecting into the inner space of at least one vertical link hingedly connected by the connecting element with at least two further vertical links, the links connected together all surrounding the longitudinal bar of the basic body with their U-shaped bow portions.

11 Claims, 5 Drawing Figures

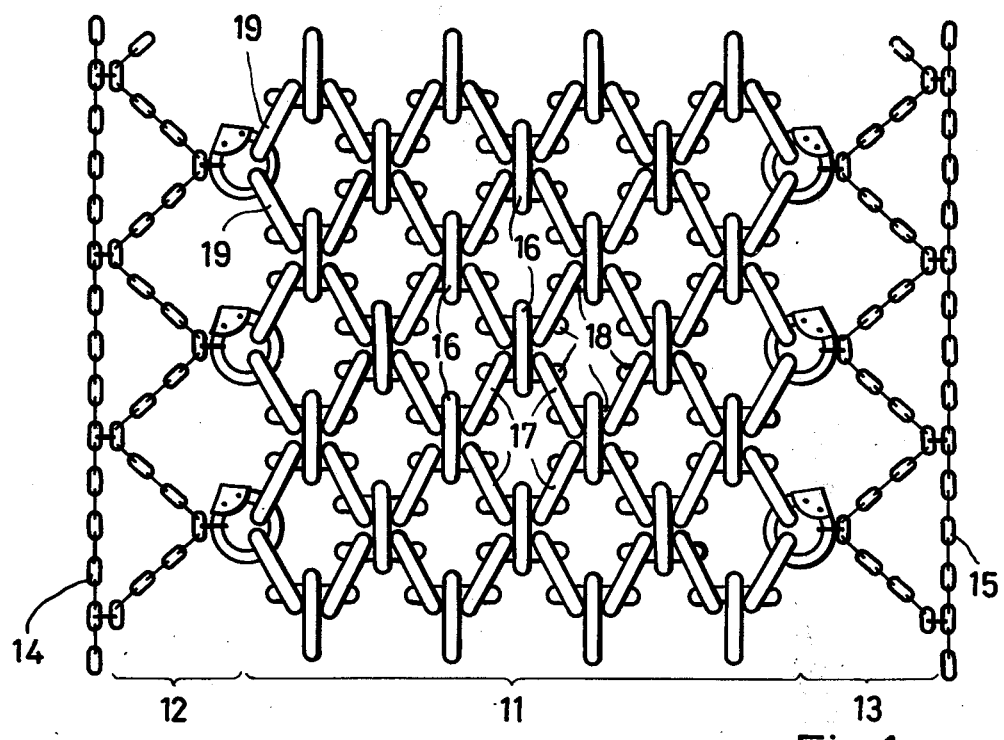
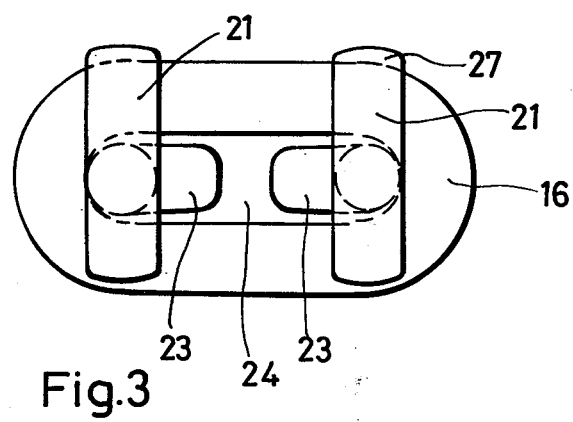
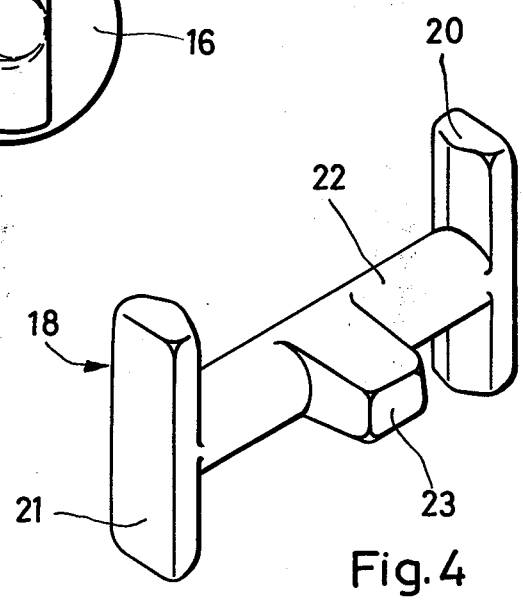

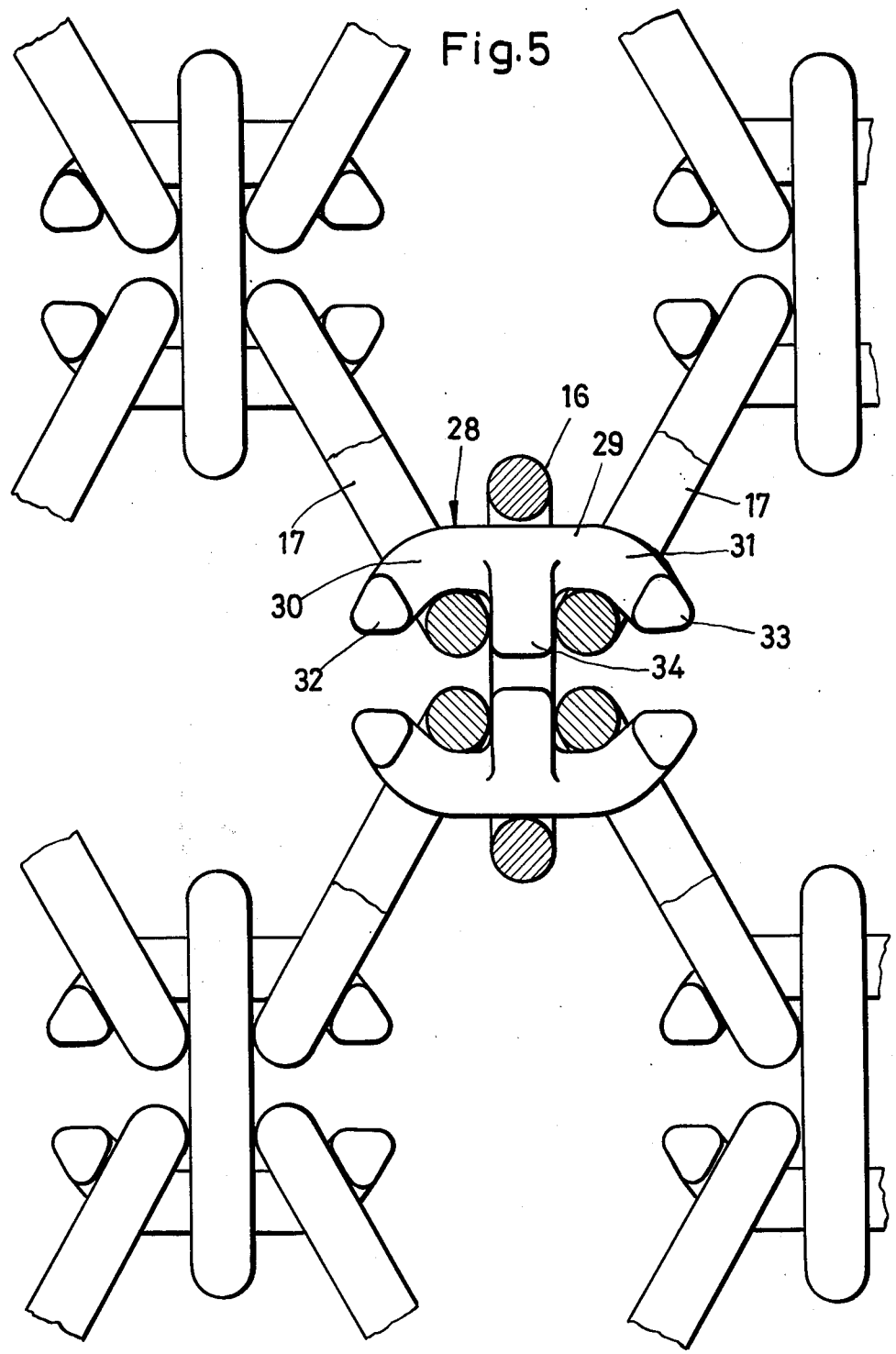

TIRE CHAIN

The invention relates to a tire chain with a plurality of essentially vertically to the tire surface orientated vertical links having a closed circumference and with detachable connecting elements which pass the inner space of the vertical links holding them safely together when the tire chain is assembled.

A tire chain of the aforementioned kind is known, in which the connecting elements are formed by U-shaped half-links having thickened leg ends, by which they are lockable inside the vertical links with the aid of adjacent horizontal links. The reason why the known tire chain is not satisfactory is that it requires the use of vertical links which have a relatively complicated shape and a great pitch.

It is the object of the invention to provide a tire chain of the kind mentioned at the beginning, i.e. a tire chain with at least one network section which can be assembled and disassembled without the aid of tools, which is distinguished by a simple structure, good flexibility and easy assembly.

This object is solved therein that the connecting elements have an essentially double T-shaped basic body and that the basic body is provided with at least one projection between its cross-bars, which is offset by 90° to the cross-bars, said projection projecting into the inner space of at least one vertical link, partially arranged between the ends of at least two further vertical links and hingedly connected with these further vertical links, said links together surrounding the longitudinal bar of the basic body with U-shaped portions.

One advantage of the tire chain according to the invention consists therein that its section which can be assembled respectively disassembled consists of only two different parts, namely of vertical links and connecting elements.

The invention is described in more detail by way of the enclosed drawing.

FIG. 1 shows the plan view of a tire chain of the kind described;

FIG. 3 shows the side view of a vertical link with two connecting elements;

FIG. 4 shows the perspective view of a connecting element and

FIG. 5 shows a network section corresponding to FIG. 2 of a modified tire chain.

Figure 2:
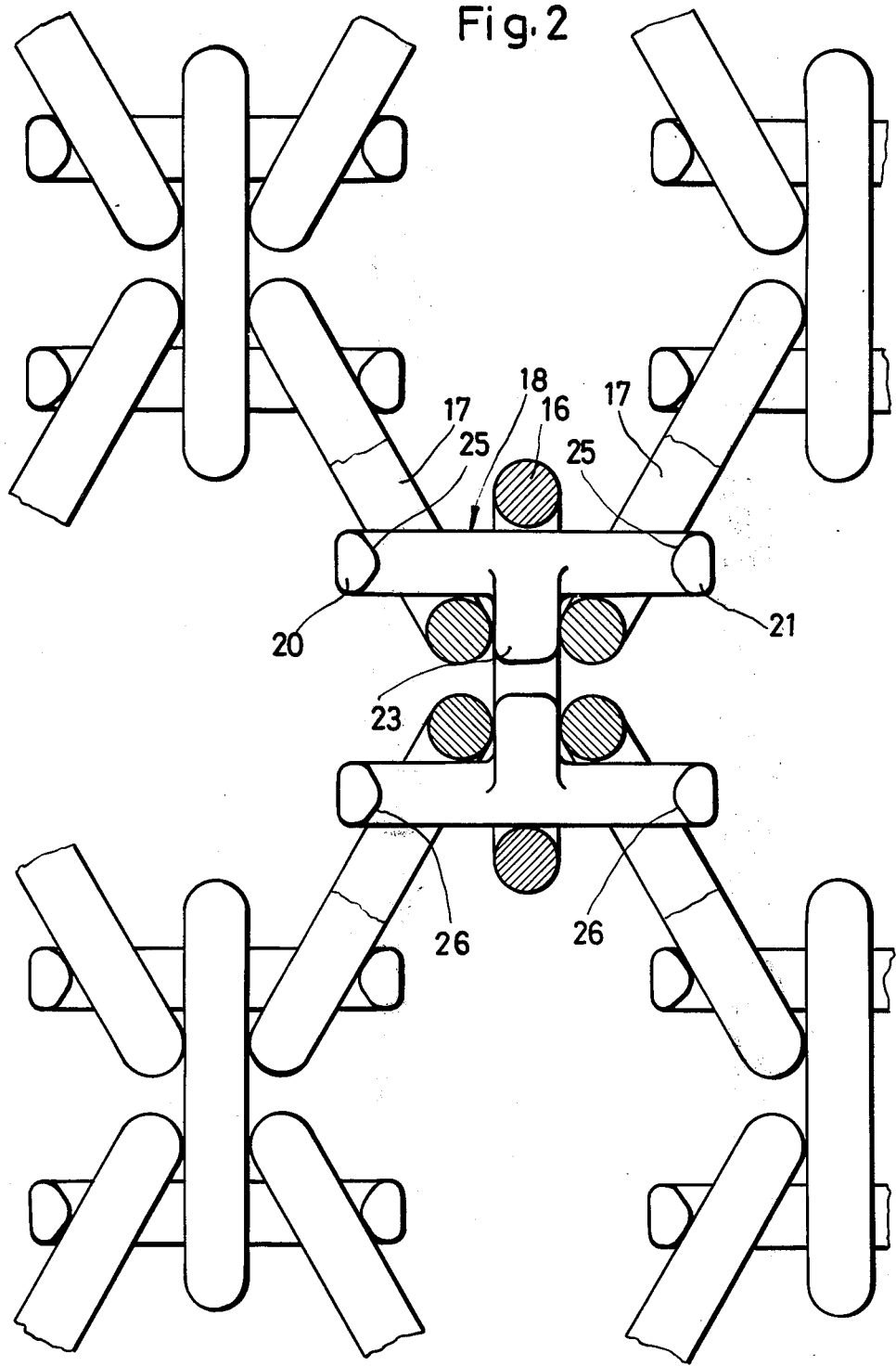
FIG. 2 shows a detail of the tire chain according to FIG. 1.

In FIG. 1 a section of a tire chain is shown, which comprises a tread network 11 and two side networks 12 and 13 with side chains 14 and 15. It can be seen that the tread network 11 consists of vertical links 16 orientated in the direction of movement and of vertical links 17 arranged transversely. The vertical links 16 are connected with four vertical links 17 by connecting elements 18 of the kind as shown in FIG. 4. The outside-lying vertical links 19 of the side network are in connection with the side network through a connecting link.

As can especially be seen from FIGS. 2-4, the connecting elements 18 consist of a double-T-shaped body having two cross-bars 20,21 and a longitudinal bar 22. The longitudinal bar 22 is provided with a projection 23, offset by 90° to the cross-bars 20 and 21. This projection 23 projects into the inner space 24 of each of the vertical links 16, the end of which surrounds the longitudinal bar in an arched manner. The sides of the cross-bars facing the transversely arranged vertical links 17 are developed in roof-shape and form surfaces 25,26 for the legs of the transversely arranged vertical links 17. All of the vertical links 16 and 17 are formed by oval round links, preferably of the same shape.

Due to the fact that the cross-bars 20,21 project differently over the longitudinal bar 22 of the connecting element, as is indicated in FIG. 3, the ends 27 of the cross-bars projecting over the vertical links 16 and 17 can be used to increase the grip.

In the embodiment according to FIG. 5 the vertical links 16 and 17 are connected with each other by connecting elements 28, the longitudinal bars 29 of which have cranked ends 30 and 31 with cross-bars 32 and 33. Such a solution offers the advantage that the cross-bars 32 and 33 which have an essentially triangular cross-section have a smaller clearance from the articulation points of the vertical links 17 than in the embodiment described at first, and that tractive forces from the vertical links 17 can be transmitted to the inner arches of the ends 30,31 without simultaneous stress of the cross-bars 32 and 33.

In this construction too one projection 34 projects into the inner space 24 of a vertical link 16.

By the use of connecting elements of the kind described, junction points of great flexibility and network configurations which guarantee high grip capability at high protective effect, are obtained.

The connecting elements used in the construction of the described tire chain can also be used for other chain types, for example for conveyor chains. Their universal use represents an additional advantage.

I claim:

1. Tire chain with a plurality of vertical links having a closed circumference and with detachable connecting elements which pass the inner space of the vertical links, holding them safely together when the tire chain is assembled, said vertical links being orientated essentially vertically to a tire surface, characterized in that the connecting elements (18; 28) have an essentially double-T-shaped basic body including two cross bars connected by a longitudinal bar positioned therebetween, and that the basic body between its cross-bars (20, 21; 32, 33) is provided with at least one projection (23, 34) offset by 90° to the cross-bars, said tion (23, 34) projecting into the inner space (24) of at least one vertical link (16) partially arranged between the ends of at least two further vertical links (17) and connected with these further vertical links, said projection being so dimensioned and positioned to form a stop for limiting free relative motion between said vertical link (16) and said connecting element, said links surrounding the longitudinal bar (22; 29) of the basic body with U-shaped portions.

2. Tire chain according to claim 1, characterized in that the vertical links (17), the ends of which are connected with the end of the vertical link (16), into the inner space of which the projection (23; 34) projects, are arranged transversely to said projection.

3. Tire chain according to claim 1, characterized in that the cross-bars (20,21;32,33) are provided with surfaces for the legs of the transversely arranged vertical links (17).

4. Tire chain according to claim 1, characterized in that the longitudinal bar (29) of the connecting element (28) has cranked ends (30,31).

5. Tire chain according to claim 1, characterized in that the cross-bars (20,21;32,33) of the connecting element (18;28) are developed roof-shaped.

6. Tire chain according to claim 1, characterized in that the vertical links (16,17) are formed by oval round links.

7. Tire chain according to claim 1, characterized in that the cross-bars (20, 21; 32, 33) of the basic body are each intersected by said longitudinal bar (22) such that each of said cross-bars define two joined arms extending in opposite directions over one end of said longitudinal bar (22), said arms being of unequal length.

8. Tire chain according to claim 7, characterized in that the length of the arm facing the tire surface is shorter than the strength of the link material of the vertical links (16, 17).

9. Tire chain according to claim 8, characterized in that the length of the arm facing away from the tire surface is longer than the strength of the link material of the vertical links (16, 17).

10. Tire chain according to claim 1, characterized in that two connecting elements (18) and one vertical link (16) form junction points connected with each other by further vertical links (17).

11. A connecting element for connecting vertical chain links of a tire chain having a plurality of vertical links, said connecting element including a double T-shaped basic body including cross bars connected by a longitudinal bar positioned therebetween, wherein said connecting element has at least one projection between said cross-bars (20, 21; 32, 33), said projection set off by 90° to said basic body, said projection serving as a stop for limiting free relative motion between said connecting element and at least one of said vertical links of said tire chain.

* * * * *

UNITED STATES PATENT OFFICE
CERTIFICATE OF CORRECTION

Patent No. 4,165,775             Dated August 28, 1979

Inventor(s) Werner Rieger

It is certified that error appears in the above-identified patent and that said Letters Patent are hereby corrected as shown below:

Column 2, line 46 (Claim 1, line 12):
      Delete "tion" and replace it with -- projection --.

Signed and Sealed this

Thirteenth Day of November 1979

[SEAL]

Attest:

RUTH C. MASON  
Attesting Officer

LUTRELLE F. PARKER  
Acting Commissioner of Patents and Trademarks